United States Patent [19]

Davidson

[11] 4,177,015

[45] Dec. 4, 1979

[54] ELECTROMAGNETIC PUMPS

[75] Inventor: Daniel F. Davidson, Altrincham, England

[73] Assignee: United Kingdom Atomic Energy Authority, London, England

[21] Appl. No.: 885,016

[22] Filed: Mar. 9, 1978

[30] Foreign Application Priority Data

Mar. 23, 1977 [GB] United Kingdom ............... 12345/77

[51] Int. Cl.² ............................................. H02N 4/20
[52] U.S. Cl. .................................................. 417/50
[58] Field of Search ......................... 417/50; 310/11

[56] References Cited

U.S. PATENT DOCUMENTS

| | | | |
|---|---|---|---|
| 3,251,302 | 5/1966 | Baker | 417/50 |
| 3,885,890 | 5/1975 | Davidson | 417/50 |

*Primary Examiner*—Carlton R. Croyle
*Assistant Examiner*—Edward Look
*Attorney, Agent, or Firm*—Larson, Taylor and Hinds

[57] ABSTRACT

An electromagnetic pump wherein a core within a tubular housing defines an annular flow path for liquid metal, the core having helical windings of metal sheathed mineral insulated conductor and each winding comprising a plurality of loops arranged in series. The windings are in direct contact with the liquid metal and thereby reduce the magnetic gap normally required in such pumps.

5 Claims, 3 Drawing Figures

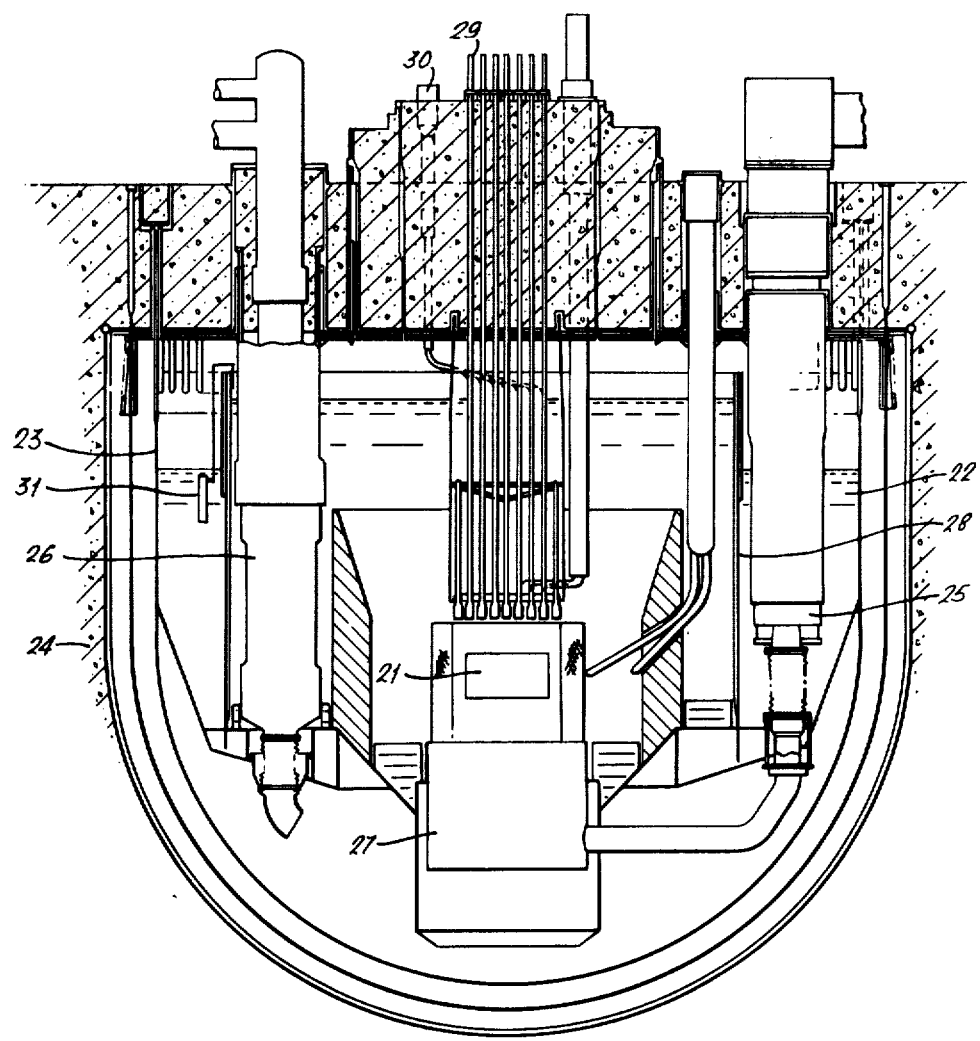

4,177,015

ELECTROMAGNETIC PUMPS

BACKGROUND OF THE INVENTION

This invention relates to electromagnetic pumps for use in pumping liquid metal such as sodium.

U.S. Pat. No. 3,885,890 discloses electromagnetic pumps for liquid metal the pumps each comprising a core within a casing which co-operate to define an annular flow duct for the liquid metal. In one described pump the core, and in a second described pump, the casing, have three helical windings which are adapted at one end for connection to a three-phase electricity supply and are interconnected by a star point connection at the other end. The windings comprise helically wound stacks of copper laminations which are insulated from their locating slots in the core or casing, as the case may be, and from a stainless steel sheath for enclosing the core or for lining the casing respectively. The sheath is required to protect the windings and their insulation from contact with the liquid metal.

SUMMARY OF THE INVENTION

According to the present invention an electromagnetic pump for liquid metal comprises a central core within a bore in a pump housing, the core being arranged co-axially with the bore to define an annular flow passage between the wall surface of the core and the wall surface of the bore and polyphase helical windings arranged co-axially with the core, the helical windings being located in equally angularly spaced helical slots formed in one of the wall surfaces, the windings of each phase comprising a plurality of loops of metal sheathed mineral insulated electrical conductor arranged in series and extending in each longitudinal direction along the wall surface within a discrete pair of diametrically opposed slots, each winding being adapted for connection to an external source of electricity supply.

The invention will reside in an electromagnetic pump comprising a central core within a bore in a pump housing, the core being arranged co-axially with the bore to define an annular flow passage between the wall surface of the core and the wall surface of the bore and three-phase helical windings arranged co-axially with the core, the helical windings being located in six equally angularly spaced helical slots formed in the surface of the core, the windings of each phase comprising a plurality of loops of metal sheathed mineral insulated electrical conductor arranged in series and extending in each longitudinal direction along the wall surface of the core within a discrete pair of diametrically opposed slots, each winding being adapted for connection to an external source of electricity supply.

A three-phase electromagnetic pump embodying the invention is of greater efficiency than the pumps disclosed in U.S. Pat. No. 3,885,890 because the windings extending in each direction along the core smooth the field distribution and being in direct contact with the liquid metal reduce the magnetic gap. Furthermore, the windings, core and bore surfaces, being in good thermal contact with the liquid metal, enable the conductor to carry a high current density without overheating. The windings of each phase, being comprised of multiple loops of conductor arranged in series, enable an adequate current density to be achieved with a relatively low current loading.

DESCRIPTION OF THE DRAWINGS

A construction of electromagnetic pump embodying the invention is described by way of example with reference to the accompanying diagrammatic drawings wherein:

FIG. 3 is a sectional view of a nuclear reactor construction in which the pump is used.

DESCRIPTION OF THE PREFERRED EMBODIMENTS

Figure 1:
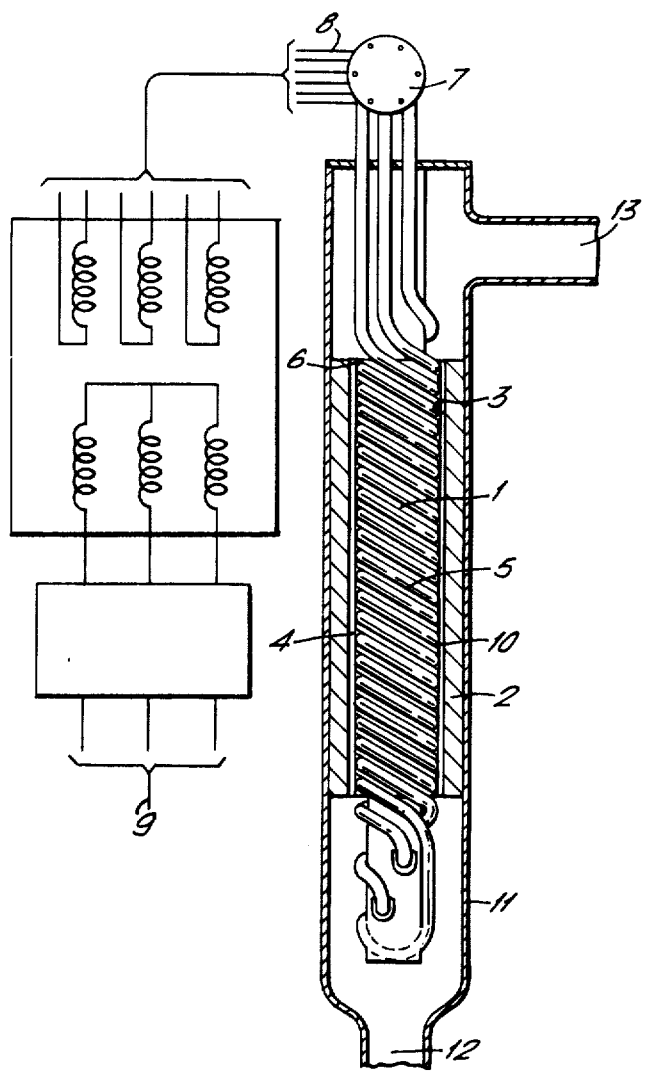
FIG. 1 is a sectional view.
Figure 2:
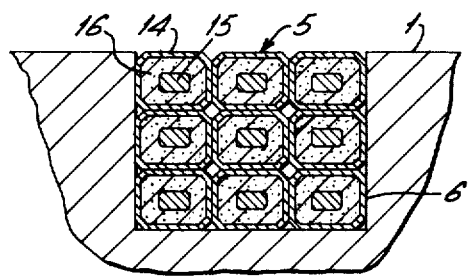
FIG. 2 is a fragmentary detail of the core of the electromagnetic pump shown in FIG. 1.

The electromagnetic pump shown in FIG. 1 comprises a central core 1 within a shell 2 both of ferritic material such as, for example, 9% or 13% chrome steel having a bore 3. The core is arranged co-axially with the bore to define an annular flow passage 4 between the wall surface of the core and the bore surface of the shell. Three-phase helical windings 5 are arranged co-axially with the core, the helical windings being located in six equally angularly spaced helical slots 6 formed in the surface of the core. The windings of each phase comprise a plurality of loops of stainless steel sheathed mineral insulated cable of a commercially available kind normally produced for use with instrumentation in hot environments, the loops being arranged in series and extending in each longitudinal direction along the wall surface of the core within a discrete pair of opposed slots. In FIG. 2 there is shown a slot 6 containing nine loops of cable. The cable comprises a stainless steel sheath 14 and a copper conductor 15 with magnesium oxide insulation 16. Each loop is swaged down to rectangular section of smaller cross-sectional area than the original cable and is shown extending by way of a junction box 7 to an electrical energy source 9. Three baffles or vanes 10 of non-magnetic material attached to the outside of the core 1 extend longitudinally along the annular flow passage 4 to suppress circular components of flow and to centralise the core in the shell. The pump is housed in a liquid metal duct 11 having an inlet port 12 and an outlet port 13.

When the three-phase helical windings are connected to a three-phase electricity supply the magnetic field produced urges the liquid metal through the duct 11 by way of the annular flow passage 4. The described construction of pump, although generally similar to the pump disclosed in U.S. Pat. No. 3,885,890 offers several improvement features. The windings now being housed in six equally angularly spaced slots, each winding extending both ways along the wall surface of the core or the bore, avoids the need for a star connection for one end of each of the three-phase windings and the modified windings smooth the field distribution and thereby increase the efficiency of the pump. The windings being metal sheathed mineral insulated conductors, are highly resistant to corrosion by liquid metal so that protective sleeves normally used for isolating the windings from the liquid metal are not required thereby reducing the magnetic gap and giving greater efficiency. The windings, core and bore being in good thermal contact with the liquid metal, enable the conductor to carry a high current density without overheating. The windings of each phase, being comprised of multiple loops of conductors arranged in series, enable an adequate current density to be achieved with a relatively low current loading and, being of rectilinear cross-section, enable a greater cross-section of copper conductor to be used in each slot thereby enhancing the current carrying capacity of the windings.

The electromagnetic pump described with reference to FIG. 1 finds application in a liquid metal cooled fast breeder nuclear reactor construction such as that shown in FIG. 2. The construction comprises a nuclear fuel assembly 21 submerged in a pool 22 of liquid sodium coolant in a primary vessel 23. The primary vessel is suspended from the roof of a containment vault 24 and there is provided a plurality of coolant pumps 25 and heat exchangers 26 only one of each of pump and heat exchanger being shown. The fuel assembly 21 mounted on a diagrid 27 is housed with the heat exchangers in a core tank 28 whilst the pumps 25, which deliver coolant to the diagrid, are disposed outside of the core tank. The fuel assembly comprises a plurality of sub-assemblies which upstand from the diagrid in closely spaced side-by-side array. Control rods 29 and instrumentation 30 penetrate the roof of the vault. A plurality of electromagnetic pumps 31 (only one being shown) serve to pump coolant from the region of the pool outside of the core tank into the tank the coolant being arranged to flow over the inner wall surface of the tank.

In operation of the nuclear reactor, liquid metal coolant drawn from the region of the pool which is outside of the core tank is passed upwardly through the fuel assembly in heat exchange therewith thence to the heat exchangers in heat exchange with a secondary liquid metal coolant, thence back to the pool 2.

In one construction of nuclear reactor the junction box 7 is disposed below the surface of the pool 22 of liquid metal and leads 8, which comprise stainless steel sheathed mineral insulated cables extending to a source of electrical energy disposed outside the vault by way of the penetration in the roof provided for the instrumentation 30, are of greater cross-section than the windings 5 because they are not in heat exchange with the coolant. However, in an alternative construction of nuclear reactor the mineral insulated windings of the electromagnetic pumps extend continuously from the core to the electrical energy source, the windings and regions of the extensions which are submerged in the pool of liquid metal being swaged to rectangular section whilst the regions of the extensions which are disposed above the surface of the pool, and therefore are not cooled by heat exchange with liquid metal, are of greater cross-sectional area.

Electromagnetic pumps of the kind described with reference to FIG. 1 are also used in varying sizes in the described nuclear reactor for such duties as, pumping samples of liquid metal flowing through the sub-assemblies to fission product detection means disposed outside of the vault 24 by way of the instrumentation 30; auxiliary shut down means whereby auxiliary control rods, supported above the fuel assembly by liquid metal supplied by electromagnetic pumps, are allowed to fall into the fuel assembly upon receipt of an emergency signal which initiates power cut off from the electromagnetic pumps; and primary coolant purification means whereby coolant drawn from the pool is pumped through cold trapping apparatus disposed outside of the vault and impurities are precipitated from the liquid metal.

Electromagnetic pumps generally as described with reference to FIG. 1 are particularly suited for use in liquid metal cooled fast breeder nuclear reactors because they are capable of high temperature operation, they are of slender form and can be accommodated in small spaces, and for maintenance the core and windings can be withdrawn from the vault through a relatively small roof penetration leaving behind only the robust ducting 11 and shell 2.

I claim:

1. An electromagnetic pump for liquid metal comprising a tubular pump housing,
    a core co-axially disposed within a bore of the housing to define an annular flow passage between the wall surface of the core and the wall surface of the bore,
    polyphase helical windings arranged co-axially with the core, the helical windings being located in equally angularly spaced helical slots formed in one of the wall surfaces, the windings of each phase comprising a plurality of loops of metal sheathed mineral insulated electrical conductor arranged in series and extending in each longitudinal direction along the wall surface within a discrete pair of diametrically opposed slots, each winding being adapted for connection to an external source of electricity supply.

2. An electromagnetic pump according to claim 1 wherein three-phase helical windings are located in six equally angularly spaced helical slots formed in the surface of the core.

3. An electromagnetic pump according to claim 2 wherein the windings of metal sheathed mineral insulated electrical conductor are of rectilinear cross-section.

4. An electromagnetic pump according to claim 3 wherein there is a plurality of vanes extending longitudinally along and radially across the annular flow passage.

5. An electromagnetic pump according to claim 1 wherein the windings of metal sheathed mineral insulated electrical conductor are of rectilinear cross-section.